OWENS, LANE & DYER.
Thrashing Machine.
No. 20,892.
Patented July 13, 1858.
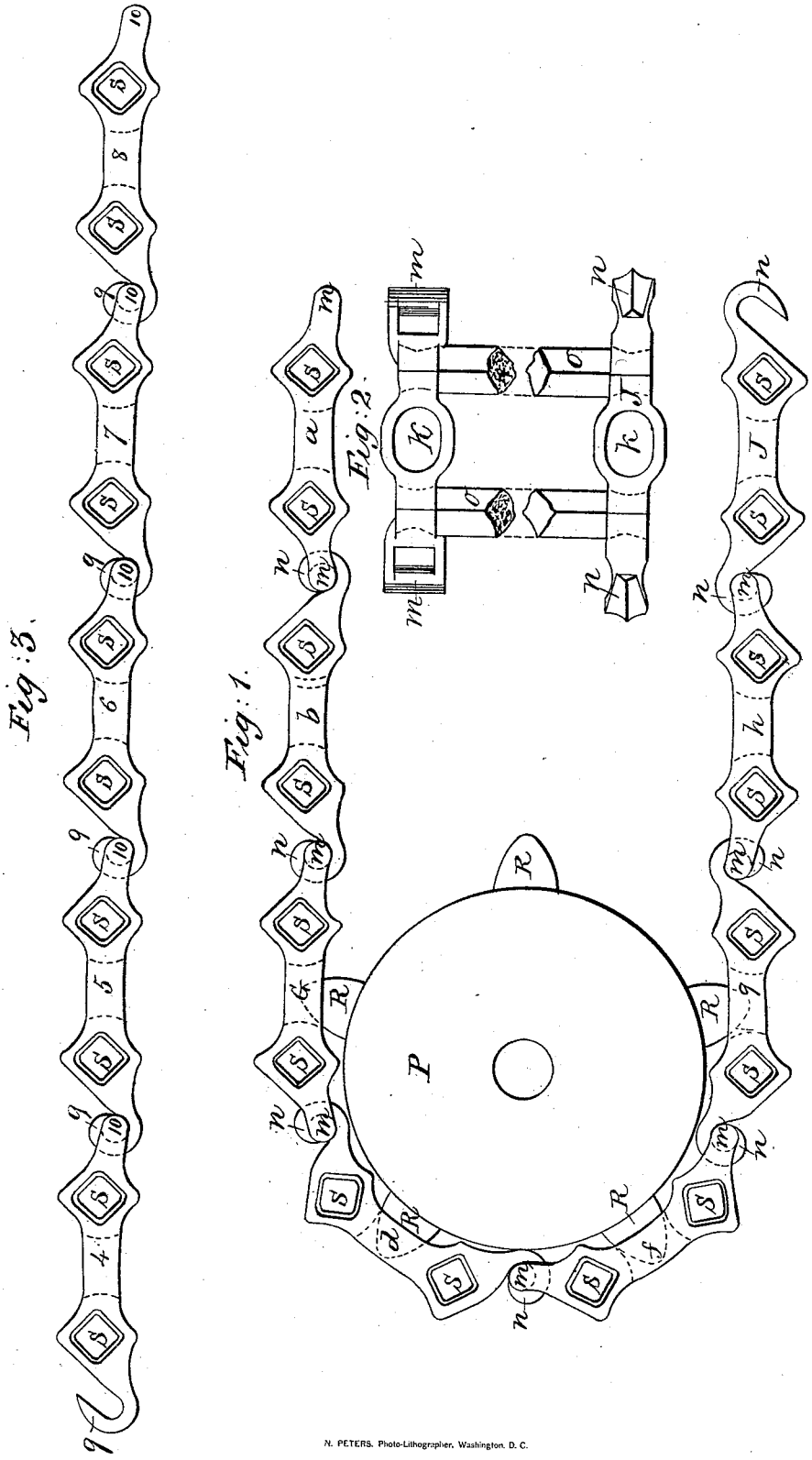

UNITED STATES PATENT OFFICE.

J. E. OWENS, C. LANE, AND E. G. DYER, OF HAMILTON, OHIO.

ENDLESS CHAIN FOR THRESHING-MACHINES.

Specification of Letters Patent No. 20,892, dated July 13, 1858.

*To all whom it may concern:*

Be it known that we, JOB E. OWENS, CLARKE LANE, and ELBRIDGE G. DYER, of Hamilton, Butler county, Ohio, have invented a new and useful Improvement in Endless Chains for the Aprons of Threshing-Machines; and we do hereby declare that the following is a full, clear, and exact description thereof, reference being had to the accompanying drawings, and to the letters and figures of reference marked thereon, and made to form part of this specification.

Similar letters and figures refer to like parts of the improvement.

Figure 1, represents a side view of a portion of the chain. Fig. 2, represents a top view of a portion thereof, and Fig. 3, represents a section of chain heretofore constructed by us, it being shown for the purpose of pointing out the advantages of our present plan.

Our invention consists in forming a chain out of malleable cast iron links of two forms, each of the alternate links being exactly alike and capable of being united into a chain without heating, and without any pieces or parts which are not cast with, and a part of the link itself.

In Fig. 1, $a$, $c$, $f$, $h$, represents one of the two kinds of links and $b$, $d$, $g$, $j$, the other kind. These links are alike except as to their ends—the first named ones, being provided with dead eyes or openings as shown at the top of Fig. 2, and forming pins or bolts $m$, $m$, at their ends. The other series of links, have at each of their ends hooks $n$, $n$, which when hooked into the openings of the first series, have their points set down with a hammer or other proper tool, so as to partially surround the pins or bolts $m$, of the other links of the series. The hooks $n$, are cast open, as seen at the lower right side of Fig. 1—but when set down with the hammer they have the form shown in the other parts of the figure.

Each of the two sets or kinds of links, have openings $s$ through them for the lags $o$, to pass into or through and also an opening $k$, which takes over the teeth R, of the pulley or drive wheel P, the sides of the links that are next the drive wheel, being arched or convex so as to fit to the perimeter of the drive wheel. A chain composed of these two kinds of links, has, to commend it, many good properties—it is strong, cheap, durable, easily put together, and readily repaired by any one, though he may not be a mechanic. It has all the elements for being united without heating any of its parts within itself. And should a link at any time give way, it can be instantly replaced by a new one. If either one of the links $b$, $d$, $g$, $j$, should break, it is only necessary to straighten out the hooks $n$, remove the pieces, and replace it by a new one. Should one of the other kind ($a$, $c$, $f$, $h$,) give way, as for instance say the one $c$, then it might be possible that three links would have to be removed, to repair the broken one, viz: the ones $b$ and $a$, which are joined to the one $c$, for the hooks though made of malleable iron, and will bend once when cold, are very apt to break in the act of being bent back and straightened out—so that those $b$, $d$, might have to be replaced also, but at no time need more than three links be lost by a break in the chain, and in a majority of cases but one.

By reference to Fig. 3, which represents a chain which we formerly built, the above illustration will be more clear. Suppose the link 6, to have given way or broken, the hook 9, of the link 7, must be raised up to remove the piece joined to it—and this hook 9 may break and thus link 7, is destroyed—and to remove the link 7, the hook on the link 8, must be straightened and it may break, and so on throughout the whole chain. This would be the effect were all the links alike or duplicates of each other. But in our present plan we use two kinds of links or segments, the alternate ones of which are duplicates, and thus we avoid the necessity in any case, and these of rare occurrence of losing more than three links.

We are aware that malleable cast iron links have been used for making endless chains, and which embrace within themselves the means of uniting without rivets &c., but they are defective in many essentials. Some have been made with a dead-eye which slips over a pin with a projection and slot, as a fastening. In these the whole strain comes upon a cast pin which is only united to the link by one of its ends, leaving the whole leverage of the link to break that fastening, while we take the draft upon a pin that is fast at both of its ends, and is consequently much more reliable. Besides with our construction there is no possibility of the links being disconnected, without they break, and we have no finishing of any kind to do the links after they are cast, a thing which has to be done to other kinds in use.

Having thus fully described the nature and objects of our improvements, what we claim therein as new and desire to secure by Letters Patent is—

A chain composed of two different kinds of malleable cast iron links, when constructed in all their parts as represented, for all the purposes mentioned in the foregoing specification, and when the alternate links of the chain are the duplicates of each other throughout the series and the two kinds of links united in the manner and for the purposes set forth.

JOB E. OWENS.
    CLARK LANE.
    ELBRIDGE G. DYER.

Witnesses:
 N. C. McFarland,
 B. F. Miller.